United States Patent [19]
Schaefer

[11] 3,894,516
[45] July 15, 1975

[54] ANIMAL SORTING GATE

[76] Inventor: Michael J. Schaefer, R.F.D., Okarche, Okla. 73762

[22] Filed: May 17, 1974

[21] Appl. No.: 470,843

Related U.S. Application Data

[63] Continuation of Ser. No. 356,770, May 3, 1973, abandoned.

[52] U.S. Cl. ............................................. 119/155
[51] Int. Cl. ............................................. A01k 29/00
[58] Field of Search ................................. 119/155

[56] References Cited
UNITED STATES PATENTS

| | | | |
|---|---|---|---|
| 3,072,100 | 1/1963 | Dustin | 119/155 |
| 3,079,711 | 3/1963 | Turner | 119/155 X |

Primary Examiner—Robert Peshock
Assistant Examiner—J. N. Eskovitz
Attorney, Agent, or Firm—John M. Fish, Jr.

[57] ABSTRACT

An adjustable animal sorting gate for selectively allowing passage of animals of less than a predetermined size therethrough while preventing passage of animals larger than the predetermined size therethrough. The sorting gate includes a rectangular support frame assembly having a plurality of vertical members disposed thereon in longitudinally spaced relation forming a plurality of spaces therebetween through which animals may pass. A rectangular sliding gate frame assembly is slidably mounted on the support frame assembly and includes a plurality of vertical members disposed thereon in longitudinally spaced relation forming a plurality of spaces therebetween having substantially the same width as the spaces in the support frame. By sliding the sliding gate frame assembly relative to the support frame assembly to a selected position, the effective width of the spaces available for passage of an animal through the sorting gate is determined. The invention includes means for conveniently adjusting the sliding gate frame assembly relative to the support frame assembly and means for locking the sliding gate frame assembly in the selected position. Also disclosed is a one-way check gate mechanism for preventing animals from returning through the sorting gate after once passing therethrough.

19 Claims, 9 Drawing Figures

FIG. 9

ANIMAL SORTING GATE

CROSS REFERENCE TO RELATED APPLICATIONS

This is a continuation of application Ser. No. 356,770, filed May 3, 1973, the entire disclosure of which is incorporated herein by reference.

BACKGROUND OF THE INVENTION

1. Field of the Invention

This invention relates generally to improvements in animal handling equipment, and more particularly, but not by way of limitation, to an animal handling apparatus for separating animals according to size.

2. Description of the Prior Art

In the animal husbandry industry it is frequently necessary to sort young cattle and swine according to size. One method of sorting animals is by merely estimating the size of the animals visually and separating particular animals from the others by hand. Another method of separating animals by size is to herd the animals through a gate structure having spaces formed therein of fixed dimension whereby the smaller animals can pass through the gate and the larger animals are prevented from passing through the gate by virtue of their size.

The method of selecting and separating animals by visual inspection and manual herding is slow, inconvenient and often inaccurate depending on the skill of the individual estimating the size of the animals. Such a method is extremely difficult and inefficient to practice when large numbers of animals are involved.

The technique of sorting animals through a gate having fixed spaces formed therein is an effective method, however, the utilization of a gate having fixed dimensions has obvious limitations due to size inflexibility. In order for one practicing this technique to sort more than one size of animals, he must have more than one sorting gate, each of which having different space dimensions.

SUMMARY OF THE INVENTION

The present invention contemplates an adjustable animal sorting gate for selectively allowing passage of animals of less than a predetermined size therethrough while preventing passage of animals larger than the predetermined size therethrough. The sorting gate comprises a rigid support frame assembly which includes an upper longitudinal frame rail member and a lower longitudinal frame rail member in spaced parallel relation with each of said longitudinal frame rail members having a first end portion and a second end portion. The support frame assembly further includes a first transverse frame end member and a second transverse frame end member in spaced parallel relation normal to the longitudinal frame rail member, the first transverse frame end member interconnecting the respective first end portions of the upper and lower longitudinal frame rail members and the second transverse frame end member interconnecting the respective second end portions of the upper and lower longitudinal frame rail members. The support frame assembly also includes a plurality of spaced parallel transverse intermediate frame members in parallel alignment with said transverse end members and interconnecting the upper and lower longitudinal frame rail members, the transverse intermediate frame members being equally longitudinally spaced from the first transverse frame end member.

A rigid sliding gate frame assembly is carried by the support frame assembly and is longitudinally slidable thereon. The rigid sliding gate frame assembly includes an upper longitudinal gate rail member and a lower longitudinal gate rail member in spaced parallel relation, each of the longitudinal gate rail members having a first end portion and a second end portion. The sliding gate frame assembly also includes a first transverse gate end member and a second transverse gate end member in spaced parallel relation normal to the longitudinal gate rail members, the first transverse gate end member interconnecting the respective first end portions of the upper and lower longitudinal frame rail members and the second transverse gate end member interconnecting the respective second end portions of the upper and lower longitudinal gate rail members. The sliding gate frame assembly further includes a plurality of spaced parallel transverse gate intermediate members in parallel alignment with the transverse gate end members and interconnecting the upper and lower longitudinal gate rail members, the transverse intermediate gate members being equally longitudinally spaced from the first transverse gate end member with the spacing being substantially equal to the spacing of the plurality of transverse intermediate frame members.

The sorting gate also includes latch means carried by the support frame assembly for selectively latching the sliding gate frame assembly in a selected position relative to the support frame assembly whereby each space between adjacent transverse frame members is divided by a respective transverse gate member to limit the size of animals which may pass through the sorting gate.

An object of the invention is to provide an animal sorting gate which may be readily adjustable to sort animals of various sizes.

Another object of the invention is to provide an adjustable animal sorting gate which is simple in construction, light in weight and strong.

A further object of the invention is to provide an adjustable animal sorting gate which permits animals to pass therethrough only in one direction.

A still further object of the invention is to provide an adjustable animal sorting gate which is economical to construct and simple to operate.

Other objects and advantages of the invention will be evident from the following detailed description when read in conjunction with the accompanying drawings.

DESCRIPTION OF THE PREFERRED EMBODIMENT

Referring now to FIGS. 1, 2, 3, 4 and 5, reference character 10 generally designates an adjustable animal sorting gate. The sorting gate 10 includes a rigid support frame assembly 12 and a rigid sliding gate frame assembly 14 carried by the support frame assembly 12 and longitudinally slidable thereon.

Figure 1:
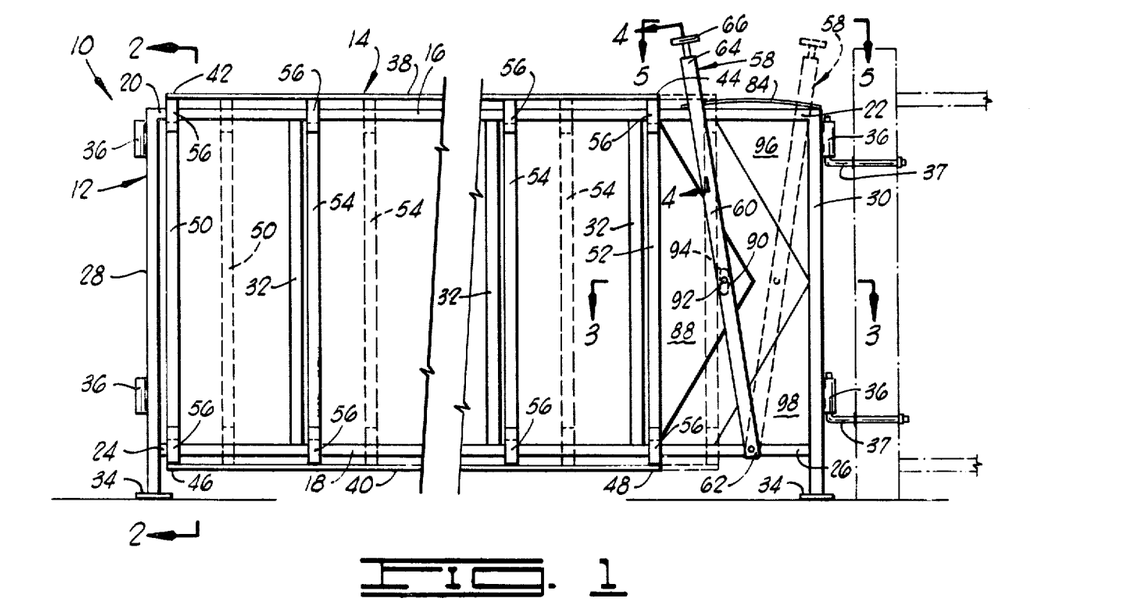
FIG. 1 is an elevation view of an animal sorting gate constructed in accordance with the present invention.

The support frame 12 includes an upper longitudinal frame rail member 16 and a lower longitudinal frame rail member 18 aligned in vertically spaced horizontal parallel relation. The upper longitudinal frame rail member 16 has a first end portion 20 and a second end portion 22 while the lower longitudinal frame rail member 18 has a first end portion 24 and a second end portion 26.

The support frame assembly 12 further includes first and second transverse frame end members 28 and 30 aligned in horizontally spaced vertical parallel relation normal to the longitudinal frame rail members 16 and 18. The first transverse frame end member 28 interconnects the respective first end portions 20 and 24 of the longitudinal frame rail members 16 and 18. The second transverse frame end member 30 interconnects the respective second end portions 22 and 26 of the longitudinal frame rail members 16 and 18.

The rigid support frame assembly 12 also includes a plurality of vertically oriented spaced parallel transverse intermediate frame members 32 mounted in parallel alignment with the transverse frame end members 28 and 30 and interconnecting the upper and lower longitudinal frame rail members 16 and 18. The transverse intermediate frame members 32 are equally longitudinally spaced from the first transverse frame end member 28.

The longitudinal frame rail members 16 and 18, the transverse frame end members 28 and 30 and the transverse intermediate frame members 32 are suitably formed of one inch square steel tubing and are suitably secured to one another by means of welding. The lower ends of the transverse frame end members 28 and 30 are preferably equipped with flat steel base plates 34 preferably welded thereto for supporting the animal sorting gate 10 on the ground. Two vertically oriented steel tube members 36 are welded to each transverse frame end member 28 and 30 to facilitate the hinged connection of the animal sorting gate 10 to a vertical gate post by means of L-shaped hinge pins 37 inserted therethrough, as shown in FIG. 1.

The rigid sliding gate frame assembly 14 includes an upper longitudinal gate rail member 38 and a lower longitudinal gate rail member 40 oriented in vertically spaced horizontal parallel relation. The upper longitudinal gate rail member 38 is positioned adjacent to and just above the upper longitudinal frame rail member 16 while the lower longitudinal gate rail member 40 is positioned adjacent to and just below the lower longitudinal frame rail member 18. The upper longitudinal gate rail member 38 includes a first end portion 42 and a second end portion 44 while the lower longitudinal gate rail member 40 includes a first end portion 46 and a second end portion 48.

The sliding gate frame assembly 14 further includes a first transverse gate end member 50 and a second transverse gate end member 52 mounted in horizontally spaced vertical parallel relation normal to the longitudinal gate rail member 38 and 40. The first transverse gate end member 50 interconnects the respective first end portions 42 and 46 of the upper and lower longitudinal gate rail members 38 and 40. The second transverse gate end member 52 interconnects the respective second end portions 44 and 48 of the upper and lower longitudinal gate rail members 38 and 40.

The rigid sliding gate frame assembly 14 further includes a plurality of vertically oriented spaced parallel transverse gate intermediate members 54 mounted in parallel alignment with the transverse gate end members 50 and 52 and interconnecting the upper and lower longitudinal gate rail members 38 and 40. The transverse intermediate gate members 54 are equally longitudinally spaced from the first transverse gate end member 50 with the spacing being substantially equal to the spacing of the previously mentioned transverse intermediate frame members 32.

The upper and lower longitudinal gate rail members 38 and 40 are preferably formed of one inch by one quarter inch steel bar stock and the transverse gate end members 50 and 52 and the transverse gate intermediate members 54 are preferably formed of 1 inch square steel tubing. The upper and lower end portions of the transverse gate end members 50 and 52 and the transverse gate intermediate gate members 54 are each secured to the respective longitudinal gate rail member 38 or 40 by means of a U-shaped steel bracket 56 which rigidly interconnects the respective transverse gate member and the respective longitudinal gate rail member. This interconnection may be suitably achieved by welding.

Figures 2, 3, 4, 5:
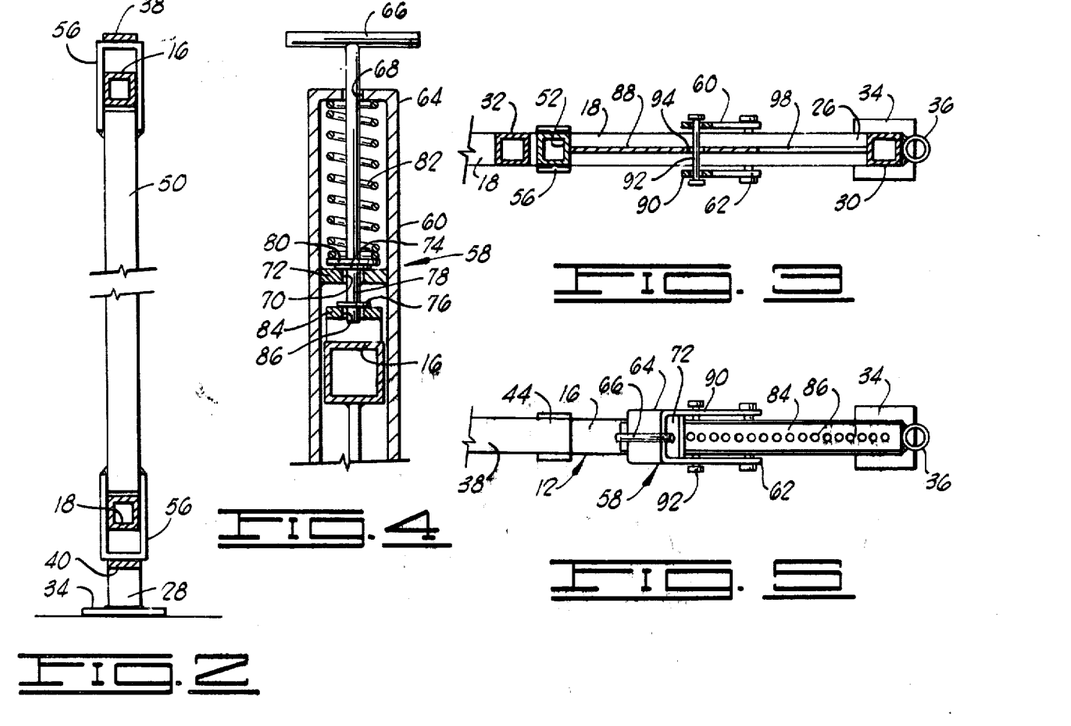
FIG. 2 is an enlarged cross-sectional view taken along line 2—2 of FIG. 1.
FIG. 3 is an enlarged cross-sectional view taken along line 3—3 of FIG. 1.
FIG. 4 is an enlarged cross-sectional view taken along line 4—4 of FIG. 1.
FIG. 5 is an enlarged top view taken along line 5—5 of FIG. 1.

As clearly illustrated in FIGS. 1 and 2, the upper and lower longitudinal frame rail members 16 and 18 are received through the U-shaped brackets 56 to provide sliding support for the rigid sliding gate frame assembly 14 on the rigid support frame assembly 12. This structure permits the sliding gate frame assembly 14 and a support frame assembly 12 to lie in substantially the same plane while permitting longitudinal sliding movement of the sliding gate frame assembly 14 relative to the support frame assembly 12.

Movement of the sliding gate frame assembly 14 relative to the support frame assembly 12 is achieved through the action of the gate adjusting assembly 58. The gate adjusting assembly includes a gate control arm 60 which is pivotally secured at its lower end portion 62 to the lower longitudinal frame rail member 18 of the support frame assembly 12 intermediate the second transverse frame end member 30 and the second transverse gate end member 52. The gate control arm 60 is preferably constructed of one and one half inch by one quarter inch steel strap material formed in an elongated U-shaped configuration and straddling the support frame assembly 12. The upper end portion 64 of the gate control arm 60 includes a T-shaped latch member 66 slidably mounted therein for movement along an axis parallel to the longitudinal axis of the gate control arm 60. The latch member 66 is slidably received through an aperture 68 formed in the upper end portion 64 of the gate control arm 60 and in an aperture 70 formed in a cross member 72 fixedly secured between the legs of the gate control arm 60.

A pair of snap rings 74 and 76 are secured in respective grooves formed in the lower portion 78 of the latch member 66 above and below the cross-member 72 to restrict the displacement of the latch member 66 within the upper end portion of the gate control arm 60. A thrust washer 80 is received on the lower portion 78 of the latch member 66 adjacent to the snap ring 74. A compression coil spring 82 is disposed around the latch member 66 intermediate the thrust washer 80 and the upper end portion 64 of the gate control arm 60 adjacent to the aperture 68.

An arcuately shaped latch plate 84 is secured to the upper side of the upper longitudinal frame rail member 16 adjacent to the second end portion 22 thereof. The latch plate 84 is preferably formed of one inch by one-quarter inch steel bar stock and is preferably welded to the longitudinal frame rail member 16. The latch plate 84 includes a plurality of spaced apertures 86 formed therein in longitudinal alignment thereon as shown in FIG. 5. The apertures 86 are sized to receive the lower end portion 78 of the latch member 66 therein in response to the urging of the compression coil spring 82.

A triangularly shaped plate 88 is fixedly secured along one edge thereof to the second transverse gate end member 52 of the sliding gate frame assembly 14 and extends therefrom toward the second transverse frame end member 30 of the rigid support frame assembly 12. The medial portion 90 of the gate control arm 60 is pivotally secured to the plate 88 by means of a pin or bolt 92 carried by the medial portion 90 and extending through a vertically elongated aperture 94 formed in the plate 88. A triangularly shaped plate 96 is fixedly secured to the second end portion 22 of the longitudinal frame rail member 16 and the second transverse frame end member 30 of the support frame assembly 12 and lies in substantially the same plane as the plate 88. Similarly, a triangularly shaped plate 98 is fixedly secured to the second end portion 26 of the lower longitudinal frame rail member 18 and the second transverse frame end member 30 of the support frame assembly 12 and is substantially coplanar with the plates 88 and 96. The plates 88, 96 and 98 provide a barrier to the passage of any animals through the sorting gate 10 between the second transverse gate end member 52 and the second transverse frame end member 30.

If the animal sorting gate 10 is to be utilized to sort swine, the vertical inside spacing between the upper and lower longitudinal frame rail members 16 and 18 will preferably be approximately 34 inches and the lower longitudinal frame rail member will be positioned approximately 4 inches above the ground. The longitudinal center-to-center distance between the transverse frame members of the support frame assembly 12 will preferably be approximately 14 inches thus providing a space between adjacent transverse frame members having a width of approximately 13 inches. In a similar manner, the longitudinal center-to-center spacing between adjacent transverse gate members of the sliding gate frame assembly 14 is also preferably approximately 14 inches thus providing a space between adjacent transverse gate members having a width of approximately 13 inches.

It will be seen that when the rigid sliding gate frame assembly is positioned all the way to the left on the rigid support frame assembly 12, as viewed in FIG. 1, the maximum opening width available to an animal passing through the gate would be approximately 12 inches. By sliding the sliding gate frame assembly 14 to the right on the support frame assembly 12, the maximum opening available to an animal passing through the gate will be correspondingly reduced. The minimum spacing which can be achieved by adjusting the sliding gate frame assembly 14 relative to the support frame assembly 12 is therefore approximately 6 inches. This position is illustrated by the dashed lines in FIG. 1.

The sliding gate frame assembly 14 may be locked in various positions relative to the support frame 12 in one-quarter inch increments. The movement of the sliding gate frame assembly 14 relative to the support frame assembly 12 is achieved by operation of the gate adjusting assembly 58. The gate adjusting assembly 58 may be locked in any one of a plurality of positions by inserting the lower portion 78 of the latch member 66 in one of the apertures 86 formed in the arcuately shaped latch plate 84 where it will be retained through the urging of the coil spring 82. In the preferred configuration, the latch plate 84 includes thirteen apertures 86 formed therein on ½ inch centers. Movement of the gate control arm 60 from a position registering with one aperture 86 to the next adjacent aperture 86 will result in a corresponding movement of the sliding gate frame assembly 14 relative to the support frame assembly 12 in the amount of ¼ inch.

It may be readily seen that the sliding gate frame assembly 14 may be positioned on the support frame assembly 12 by means of the gate adjusting assembly 58 in 13 different positions by selecting the appropriate aperture 86 in which the lower portion 78 of the latch member 66 is engaged.

It will be readily apparent that the adjustable animal sorting gate 10 may be varied in size from the configuration described above to adapt the gate for sorting other animals such as calves. Such a gate would preferably have an inside dimension between the upper and lower longitudinal frame rail members 16 and 18 of approximately 36 inches with the lower longitudinal frame rail member 18 being positioned approximately 12 inches above the ground. Such a gate would also include longitudinal center-to-center spacing between adjacent transverse gate members and between adjacent transverse frame members of approximately 24 inches. The latch plate 84 would be adapted to include either 23 apertures 86 having center-to-center spacing of one-half inch or 12 apertures 86 having center-to-center spacing of one inch. The operation of such a gate would be substantially identical to the operation of the gate described above, which operation will next be described in detail.

Operation of the Embodiment of FIGS. 1–5

To operate the animal sorting gate 10, the apparatus is first secured to an opening between two segments of fence. One or both ends of the animal sorting gate 10 will be suitable secured to a convenient fence post by means of the previously mentioned hinge pins 37 and tubular members 36 or by wiring the animal sorting gate 10 to the fence or gate post.

The animal sorting gate 10 is then adjusted to proper size to allow passage of smaller animals therethrough while preventing passage of the larger animals. This is accomplished by disengaging the T-shaped latch member 66 from the latch plate 84 and pivoting the gate control arm 60 until the proper relationship between the sliding gate frame assembly 14 and the support frame assembly 12 is achieved. The gate 10 is then locked in the proper position by releasing the latch member 66 such that the lower portion 78 thereof is engaged in the proper aperture 86 in the latch plate 84.

Figure 6:
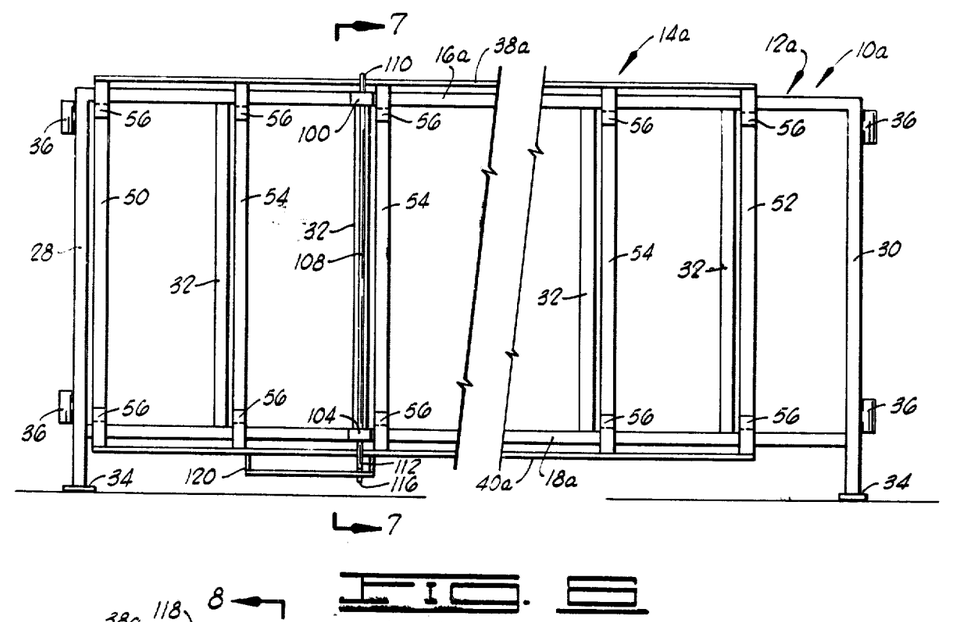
FIG. 6 is an elevational view of another form of animal sorting gate constructed in accordance with the present invention.
Figure 7:
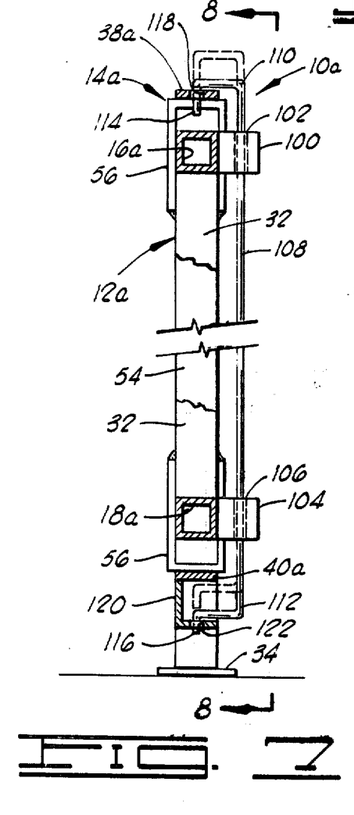
FIG. 7 is an enlarged cross-sectional view taken along line 7—7 of FIG. 6.
Figure 8:
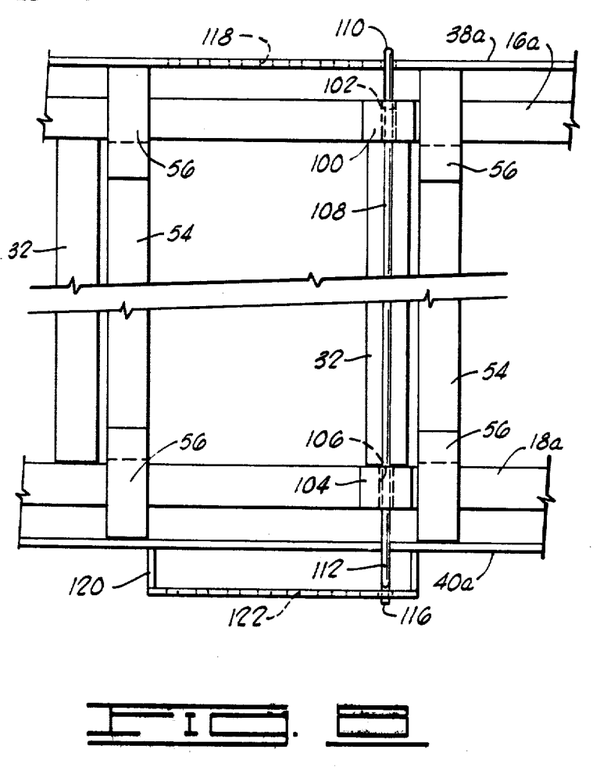
FIG. 8 is a partial elevational view of the animal sorting gate taken along line 8—8 of FIG. 7 illustrating details of the latching mechanism structure.

Description of the Embodiment of FIGS. 6, 7 and 8

Referring now to FIGS. 6, 7 and 8, reference character 10a generally designates an alternate form of adjustable animal sorting gate differing slightly from the sorting gate 10. The primary difference between the sorting gates 10a and 10 is in the means for securing the slightly modified sliding gate frame assembly 14a to the slightly modified support frame assembly 12a when these elements are properly positioned relative to one another. Those elements which are substantially identical to elements described above for the sorting gate 10 are assigned the same reference characters.

An upper block 100 is formed on the slightly modified upper longitudinal frame rail member 16a adjacent to one of the transverse intermediate frame members 32. The upper block 100 includes a vertically aligned bore 102 formed therethrough. A lower block 104 is formed on the slightly modified lower longitudinal frame rail member 18a adjacent to the opposite end of the previously mentioned transverse intermediate frame member 32 and includes a vertically aligned bore 106 formed therethrough. The bores 102 and 106 of the upper and lower blocks 100 and 104 are in coaxial alignment.

A locking bar 108 is slidably disposed in the bores 102 and 106 and is supported by the upper and lower blocks 100 and 104. The locking bar 108 includes a C-shaped upper end portion 110 and a Z-shaped lower end portion 112. The upper end portion 110 includes a downwardly extending tip 114 and the lower end portion 112 includes a downwardly extending tip 116. A plurality of apertures 118 are formed in spaced relation in the slightly modified upper longitudinal gate rail member 38a and are sized to receive the tip 114 of the locking bar 108 therein. A locking plate 120, having an L-shaped cross-section, is formed on the lower portion of the slightly modified lower longitudinal gate rail member 40a and includes a plurality of apertures 122 formed therein in spaced relation and sized to receive the tip 116. The apertures 118 and the apertures 122 are positioned along their respective lines parallel to the longitudinal axes of the upper and lower longitudinal gate rail members 38a and 40a.

In a preferred configuration, there are eleven apertures 118 and eleven apertures 122 with center-to-center spacing of one inch. The apertures 118 and the apertures 122 are respectively vertically aligned.

The sorting gate 10a may be adjusted by sliding the sliding gate frame assembly 14a relative to the support frame assembly 12a while the locking bar 108 is raised to its uppermost position as illustrated by the dashed lines in FIG. 7. When the sliding gate frame assembly 14a is in the proper position, it may be locked to the support frame assembly 12a by lowering the locking bar 108 until the tips 114 and 116 are received in respective apertures 118 and 122, where they will be retained through the force of gravity acting on the locking bar 108.

The animal sorting gate 10a may be advantageously utilized for sorting animals such as calves. The gate 10a would preferably have an inside dimension between the upper and lower longitudinal frame rail members 16a and 18a of approximately thirty six inches with the lower longitudinal frame rail member 18a being positioned approximately 12 inches above the ground. Such a gate would also include longitudinal center-to-center spacing between adjacent transverse gate members and between adjacent transverse frame members of approximately 24 inches. A gate so constructed, will have opening widths varying in one inch increments between a maximum of 22 inches to a minimum of 12 inches.

Operation of the Embodiment of FIGS. 6, 7 and 8

The operation of the animal sorting 10a is substantially identical to that described in detail above for the animal sorting gate 10. Adjustment of the animal sorting gate 10a, however, is achieved by raising the locking bar 108 until the tips 114 and 116 thereof are disengaged from the respective apertures 118 and 122. The sliding gate frame assembly 14a is then adjusted relative to the support frame assembly 12a until the proper sizing is achieved to pass only animals below a designated size through the sorting gate 10a. The animal sorting gate 10a is then locked in the proper position by lowering the locking bar 108 until the tips 114 and 116 are engaged in the appropriate respective apertures 118 and 122 thus locking the sliding gate frame assembly 14a to the support frame assembly 12a.

Figure 9:
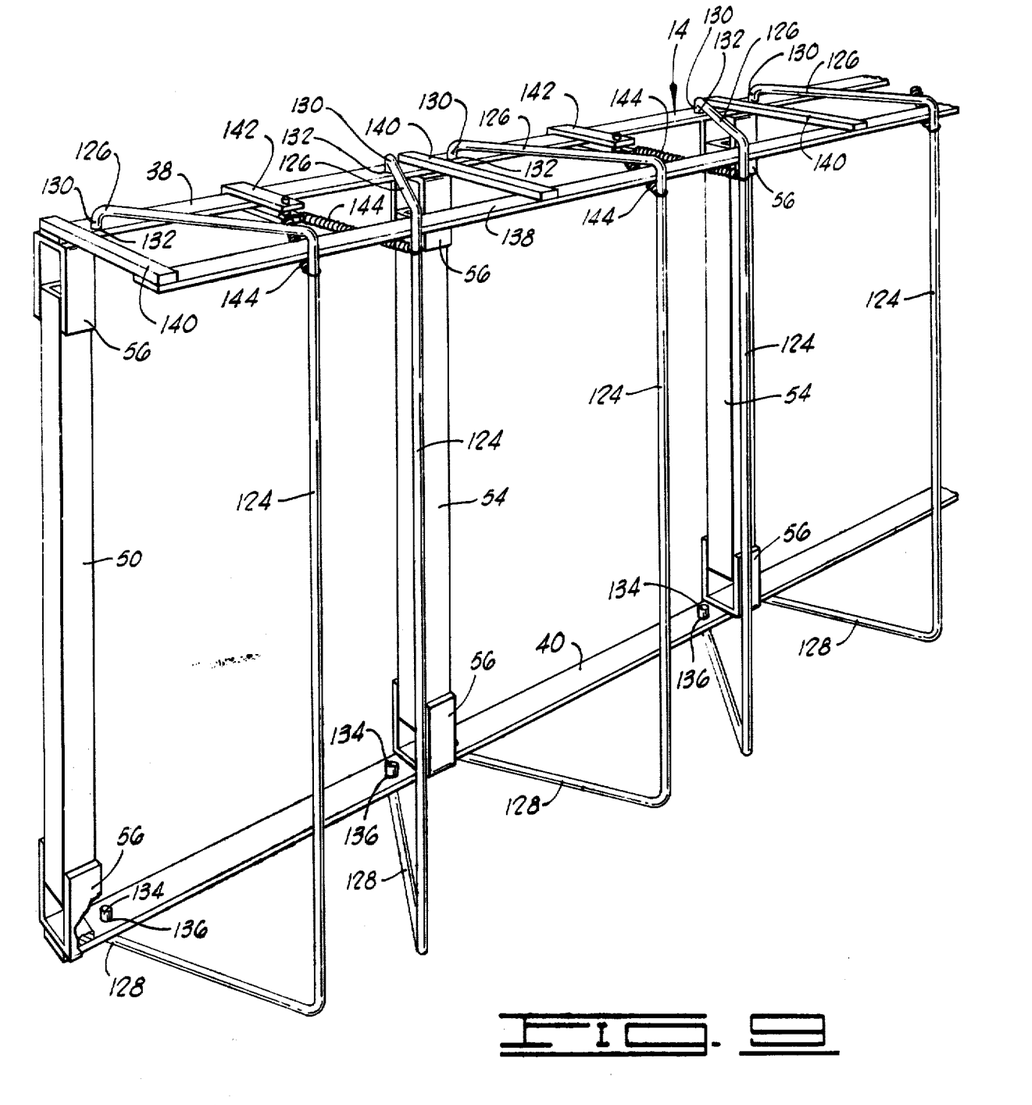
FIG. 9 is a partial perspective view of the sliding gate frame assembly of FIG. 1 illustrating the one-way gate mechanism installed thereon.

Description of the Embodiment of FIG. 9

FIG. 9 illustrates a one-way check gate apparatus suitable for installation on either of the previously described sliding gate frame assemblies 14 or 14a. The one-way check gate apparatus comprises a plurality of C-shaped check gate members 124 each having an upper end portion 126 and a lower end portion 128. A downwardly extending tip 130 on the upper end portion 126 is received in an aperture 132 formed in the upper longitudinal gate rail member 38 adjacent to the point of connection between a respective U-shaped bracket 56 and the upper longitudinal gate rail member 38. An upwardly extending tip 134 formed on the lower end portion 128 of each check gate member 124 is received in a respective aperture 136 formed in the lower longitudinal gate rail member 40 adjacent to the point of connection of a respective U-shaped bracket 56 and the lower longitudinal frame gate rail member 40. The C-shaped check gate members 124 are preferably formed of spring steel bar stock of approximately ¼ inch diameter. The tips 130 and 134 are retained in the respective apertures 132 and 136 by means of a weld bead formed thereon thereby preventing the withdrawal of the tips 130 and 134 from the respective apertures 132 and 136.

A longitudinal stop bar 138 is fixedly mounted to the upper longitudinal gate rail member 38 in parallel relation thereto by a plurality of horizontally extending support arms 140. Each support arm 140 is welded to the upper longitudinal gate rail member 38 adjacent to a respective U-shaped bracket 56 at one end thereof while the opposite end of each support arm 140 is welded to the longitudinal stop bar 138.

A bracket 142 is fixedly secured to the upper longitudinal gate rail member 38 intermediate adjacent support arms 140. A tension coil spring 144 interconnects each C-shaped check gate member 124 and the bracket 142 nearest thereto. The tension coil springs 144 yieldably urge the respective C-shaped check gate members 124 against the longitudinal stop bar 138.

When the sliding gate frame assembly 14 is equipped with the C-shaped check gate members 124 as illustrated in FIG. 9, animals passing through the adjustable animal sorting gate 10 can freely pass through the sorting gate 10 in one direction only. It will be readily apparent that an animal can only pass through the check gate equipped sorting gate by entering from the side of the sorting gate opposite the longitudinal stop bar 138.

It has been found to be most advantageous to form the C-shaped check gate members 124 of spring steel bar stock, as noted above, since such material can readily withstand the impact of heavy animal bodies passing through without damage to the check gate members due to the inherent resiliance of the material from which they are formed.

It will be seen from the foregoing detailed description of the present invention that the apparatus described therein readily obtains the objectives set forth above. Changes may be made in the construction and arrangement of parts or elements of the various embodiments described above without departing from the spirit and scope of the present invention as defined herein.

What is claimed is:

1. An adjustable animal sorting gate for allowing passage of animals of less than a predetermined size therethrough while preventing passage of animals larger than the predetermined size therethrough, comprising:
   a rigid support frame assembly including:
      an upper longitudinal frame rail member and a lower longitudinal frame rail member in spaced parallel relation, each of said longitudinal frame rail members having a first end portion and a second end portion;
      a first transverse frame end member and a second transverse frame end member in spaced parallel relation normal to said longitudinal frame rail members, said first transverse frame end member interconnecting the respective first end portions of said upper and lower longitudinal frame rail members and said second transverse frame end member interconnecting the respective second end portions of said upper and lower longitudinal frame rail members; and
      a plurality of spaced parallel transverse intermediate frame members in parallel alignment with said transverse frame end members and interconnecting said upper and lower longitudinal frame rail members, said transverse intermediate frame members being equally longitudinally spaced from said first transverse frame end member;
   a rigid sliding gate frame assembly carried by said support frame assembly and longitudinally slidable thereon, including:
      an upper longitudinal gate rail member and a lower longitudinal gate rail member in spaced parallel relation, each of said longitudinal gate rail members having a first end portion and a second end portion;
      a first transverse gate end member and a second transverse gate end member in spaced parallel relation normal to said longitudinal gate rail members, said first transverse gate end member interconnecting the respective first end portions of said upper and lower longitudinal gate rail members and said second transverse gate end member interconnecting the respective second end portions of said upper and lower longitudinal gate rail members; and
      a plurality of spaced parallel transverse gate intermediate members in parallel alignment with said transverse gate end members and interconnecting said upper and lower longitudinal gate rail members, said transverse gate intermediate members being equally longitudinally spaced from said first transverse gate end member, said spacing being substantially equal to the spacing of said plurality of transverse intermediate frame members; and
   latch means carried by said support frame assembly for selectively latching said sliding gate frame assembly in a selected one of plural discrete positions relative to said support frame assembly whereby each space between adjacent transverse frame members is divided by a respective transverse gate member to limit the size of animals which may pass through said sorting gate.

2. An animal sorting gate as defined in claim 1 characterized further to include:
   adjusting means interconnecting said support frame assembly and said sliding gate frame assembly for moving said sliding gate frame assembly relative to said support frame assembly to a selected position.

3. An animal sorting gate as defined in claim 2 wherein said adjusting means is characterized further to include:
   an elongated lever arm having a lower end portion, an upper end portion and a medial portion, the lower end portion thereof being pivotally secured to said lower longitudinal frame rail member for rotational movement substantially in the plane of said support frame assembly and about an axis normal to said plane, the upper end portion thereof extending a distance beyond said upper longitudinal frame rail member; and
   connecting means for interconnecting the second transverse gate end member and the medial portion of said lever arm whereby said sliding gate frame assembly is movable relative to said support frame assembly in response to rotation of said lever arm about the pivotal thereof.

4. An animal sorting gate as defined in claim 1 wherein said support frame assembly and said sliding gate frame assembly lie in substantially the same plane.

5. An animal sorting gate as defined in claim 4 wherein said upper and lower longitudinal frame rail members are slidably received through respective apertures formed in said first and second transverse gate end members and said transverse gate intermediate members whereby said sliding gate frame assembly is longitudinally slidably supported on said support frame assembly.

6. An animal sorting gate as defined in claim 5 characterized further to include:
   first support leg means formed on said first transverse frame end member adjacent to said lower longitudinal frame rail member for supporting one end portion of said animal sorting gate a predetermined distance above the ground; and
   second support leg means formed on said second transverse frame end member adjacent to said lower longitudinal frame rail member for supporting the opposite end portion of said animal sorting gate a predetermined distance above the ground.

7. An animal sorting gate as defined in claim 6 characterized further to include:
   hinge means mounted on said support frame assembly for hingedly supporting said animal sorting gate for swinging movement about a substantially vertical axis.

8. An animal sorting gate as defined in claim 1 characterized further to include:
   a plurality of transversely aligned one-way check gates each of which being hingedly supported on said sliding gate frame assembly for hinged movement about an axis in substantial alignment with a respective one of said transverse gate members, each of said one-way check gates extending to the same side of said sliding gate frame assembly;
   biasing means interconnecting said sliding gate frame assembly and each one-way check gate for urging hinged movement of each one-way check gate about the respective axis of rotation thereof toward said sliding gate frame assembly; and
   stop means interposed between said one-way check gates and said sliding gate frame assembly for retaining each of said one-way check gates in a partially open position against the urging of said biasing means so that as an animal passes through said animal sorting gate the one-way check gate partially blocking passage therethrough will be forced fully open against the urging of said biasing means by the body of the animal and will return to the partially open position after the animal has passed by and prevent return movement of animals through said sorting gate in the opposite direction.

9. An animal sorting gate as defined in claim 8 wherein said biasing means is characterized further to include:
   a coil tension spring interconnecting each said one-way check gate and said upper longitudinal gate rail member.

10. An animal sorting gate as defined in claim 1 wherein said latch means is characterized further to include:
    a locking bar slidably mounted on said rigid support frame assembly adjacent and parallel to one said transverse intermediate frame member for sliding movement parallel thereto, said locking bar having a first downwardly extending tip formed on the upper end portion thereof and a second downwardly extending tip formed on the lower end portion thereof;
    a plurality of apertures formed in spaced relation in said upper longitudinal gate frame member, each said aperture being sized and shaped to receive the first downwardly extending tip of said locking bar therein;
    a locking plate fixedly secured to and in parallel alignment with said lower longitudinal gate frame member; and
    a plurality of apertures formed in spaced relation in said locking plate, each said aperture being sized and shaped to receive the second downwardly extending tip of said locking bar therein.

11. An adjustable animal sorting gate for allowing passage of animals of less than a predetermined size therethrough while preventing the passage of animals larger than the predetermined size therethrough, comprising:
    a rigid support frame assembly including:
       an upper longitudinal frame rail member and a lower longitudinal frame rail member in spaced parallel relation, each of said longitudinal frame rail members having a first end portion and a second end portion;
       a first transverse frame end member and a second transverse frame end member in spaced parallel relation normal to said longitudinal frame rail member, said first transverse frame rail member interconnecting the respective first end portions of said upper and lower longitudinal frame rail members and said second transverse frame end member interconnecting the respective second end portions of said upper and lower longitudinal frame rail members; and
       a plurality of spaced parallel transverse intermediate frame members in parallel alignment with said transverse frame end members and interconnecting said upper and lower longitudinal frame rail members, said transverse intermediate frame members being equally longitudinally spaced from said first transverse frame end member;
    a rigid sliding gate frame assembly carried by said support frame assembly and longitudinally slidable thereon, including:
       an upper longitudinal gate rail member and a lower longitudinal gate rail member in spaced parallel relation, each of said longitudinal gate rail members having a first end portion and a second end portion;
       a first transverse gate end member and a second transverse gate end member in spaced parallel relation normal to said longitudinal gate rail members, said first transverse gate end member interconnecting the respective first end portions of said upper and lower longitudinal gate rail members and said second transverse gate end member interconnecting the respective second end portions of said upper and lower longitudinal gate rail members; and
       a plurality of spaced parallel transverse gate intermediate members in parallel alignment with said transverse gate end members and interconnecting said upper and lower longitudinal gate rail members, said transverse gate intermediate members being equally longitudinally spaced from said first transverse gate end member, said spacing being substantially equal to the spacing of said plurality of transverse intermediate frame members;
    an elongated lever arm having a lower end portion, an upper end portion and a medial portion, the lower end portion thereof being pivotally secured to said lower longitudinal frame rail member for rotational movement substantially in the plane of said support frame assembly and about an axis normal to said plane, the upper end portion thereof extending a distance beyond said upper longitudinal frame rail member;
    connecting means for interconnecting the second transverse gate end member and the medial portion of said lever arm whereby said sliding gate frame assembly is movable relative to said support frame assembly in response to rotation of said lever arm about the pivotal axis thereof;

an elongated latch member slidably supported in the upper end portion of said lever arm in longitudinal alignment therewith, said latch member having an outer end extending outwardly from said lever arm and having an inner end extending in the opposite direction toward said upper longitudinal frame rail member;

a latch plate fixedly secured to said upper longitudinal frame rail member and having a plurality of apertures formed therein sized and shaped to receive the inner end of said elongated latch member therein;

biasing means carried by said lever arm for urging said elongated latch member toward said latch plate to insert the inner end of said latch member into a selected one of said apertures in said latch plate; and handle means formed on the outer end of said elongated latch member for applying manual force to said elongated latch member to overcome the urging of said biasing means and withdraw the inner end of said latch member from the selected aperture in said latch plate.

12. An adjustable animal sorting gate for allowing passage of animals of less than a predetermined size therethrough while preventing passage of animals larger than the predetermined size therethrough, comprising:

a rigid support frame assembly including:
an upper longitudinal frame rail member and a lower longitudinal frame rail member in spaced parallel relation, each of said longitudinal frame rail members having a first end portion and a second end portion;

a first transverse frame end member and a second transverse frame end member in spaced parallel relation normal to said longitudinal frame rail members, said first transverse frame end member interconnecting the respective first end portions of said upper and lower longitudinal frame rail members and said second transverse frame end member interconnecting the respective second end portions of said upper and lower longitudinal frame rail members; and a plurality of spaced parallel transverse intermediate frame members in parallel alignment with said transverse frame end members and interconnecting said upper and lower longitudinal frame rail members, said transverse intermediate frame members being equally longitudinally spaced from said first transverse frame end member;

a rigid sliding gate frame assembly carried by said support frame assembly and longitudinally slidable thereon, including:

an upper longitudinal gate rail member and a lower longitudinal gate rail member in spaced parallel relation, each of said longitudinal gate rail members having a first end portion and a second end portion;

a first transverse gate end member and a second transverse gate end member in spaced parallel relation normal to said longitudinal gate rail members, said first transverse gate end member interconnecting the respective first end portions of said upper and lower longitudinal gate rail members and said second transverse gate end member interconnecting the respective second end portions of said upper and lower longitudinal gate rail members; and a plurality of spaced parallel transverse gate intermediate members in parallel alignment with said transverse gate end members and interconnecting said upper and lower longitudinal gate rail members, said transverse gate intermediate members being equally longitudinally spaced from said first transverse gate end member, said spacing being substantially equal to the spacing of said plurality of transverse intermediate frame members; and means operably interengaging said support frame assembly and said sliding gate frame assembly for longitudinally slidably moving said sliding gate frame assembly relative to said support frame assembly whereby each space between adjacent transverse frame members is divided by a respective transverse gate member to limit the size of animals which may pass through said sorting gate;

a plurality of transversely aligned one-way check gates each being hingedly carried by said support frame assembly for hinged movement about an axis in substantial parallel alignment with a respective one of said transverse gate members, each of said one-way check gates extending to the same side of said support frame assembly;

biasing means carried by said support frame assembly and operably engaging each one-way check gate for urging hinged movement of each oneway check gate about the respective axis of rotation thereof toward said support frame assembly; and stop means carried by said support frame assembly for retaining each of said one-way check gates in a partially open position against the urging of said biasing means so that as an animal passes through said animal sorting gate the one-way check gate partially blocking passage therethrough will be forced fully open against the urging of said biasing means by the body of the animal and will return to the partially open position after the animal has passed by and prevent return movement of animals through said sorting gate in the opposite direction.

13. An animal sorting gate as defined in claim 12 wherein said biasing means is characterized further to include:

a coil tension spring connected at one end thereof to each said one-way check gate; and means connecting the opposite end of each coil tension spring to said support frame assembly.

14. An animal sorting gate as defined in claim 12 wherein said biasing means is characterized further to include:

a coil tension spring interconnecting each said one-way check gate and said upper longitudinal gate rail member.

15. In an adjustable animal sorting gate for allowing passage of animals of less than a predetermined size therethrough while preventing passage of animals larger than the predetermined size therethrough of the type which includes a rigid support frame assembly including: an upper longitudinal frame rail member and a lower longitudinal frame rail member in spaced parallel relation, each of said longitudinal frame rail members having a first end portion and a second end portion; a first transverse frame end member and a second transverse frame end member in spaced parallel relation normal to said longitudinal frame rail members, said first transverse frame end member interconnecting the respective first end portions of said upper and lower longitudinal frame rail members and said second transverse frame end member interconnecting the respective second end portions of said upper and lower longitudinal frame rail members; and a plurality of spaced parallel transverse intermdiate frame members in parallel alignment with said transverse frame end members and interconnecting said upper and lower longitudinal frame rail members, said transverse intermediate frame members being equally longitudinally spaced from said first transverse frame end member; a rigid sliding gate frame assembly carried by said support frame assembly and longitudinally slidable thereon, including: an upper longitudinal gate rail member and a lower longitudinal gate rail member in spaced parallel relation, each of aid longitudinal gate rail members having a first end portion and a second end portion; a first transverse gate end member and a second transverse gate end member in spaced parallel relation normal to said longitudinal gate rail members, said first transverse gate end member interconnecting the respective first end portions of said upper and lower longitudinal gate rail members and said second transverse gate end member interconnecting the respective second end portions of said upper and lower longitudinal gate rail members; and a plurality of spaced parallel transverse gate intermediate members in parallel alignment with said transverse gate end members and interconnecting said upper and lower longitudinal gate rail members, said transverse gate intermediate members being equally longitudinally spaced from said first transverse gate end member, said spacing being substantially equal to the spacing of said plurality of transverse intermediate frame members; and means operably interengaging said support frame assembly and said sliding gate frame assembly for longitudinally slidably moving said sliding gate frame assembly relative to said support frame assembly whereby each space between adjacent transverse frame members is divided by a respective transverse gate member to limit the size of animals which may pass through said sorting gate; the improvement comprising:

a plurality of transversely aligned one-way check gates each of which being hingedly carried by said support frame assembly for hinged movement about an axis in substantial parallel alignment with a respective one of said transverse frame members, each of said one-way check gates extending to the same side of said support frame assembly;

biasing means carried by said support frame assembly and operably engaging each one-way check gate for urging hinged movement of each one-way check gate about the respective axis of rotation thereof toward said support frame assembly; and stop means carried by said support frame assembly and operably engageable with said one-way check gates for retaining each of said one-way check gates in a partially open position against the urging of said biasing means so that as an animal passes through said animal sorting gate the one-way check gate partially blocking passage therethrough will be forced open against the urging of said biasing means by the body of the animal and will return to the partially open position after the animal has passed by and prevent return movement of animals through said sorting gate in the opposite direction.

16. An animal sorting gate as defined in claim 15 wherein said biasing means is characterized further to include:

a coil tension spring connected at one end thereof to each said one-way check gate; and means connecting the opposite end of each coil tension spring to said support frame assembly.

17. An animal sorting gate as defined in claim 15 wherein said biasing means is characterized further to include:

a coil tension spring interconnecting each said one-way check gate and said upper longitudinal gate rail member.

18. An animal sorting gate as defined in claim 12 wherein each one-way check gate is formed of a substantially C-shaped length of spring steel bar stock.

19. An animal sorting gate as defined in claim 15 wherein each one-way check gate is formed of a substantially C-shaped length of spring steel bar stock.

* * * * *

PO-1050
(5/69)

UNITED STATES PATENT OFFICE
CERTIFICATE OF CORRECTION

Patent No. 3,894,516        Dated July 15, 1975

Inventor(s) Michael J. Schaefer

It is certified that error appears in the above-identified patent and that said Letters Patent are hereby corrected as shown below:

In Column 4, line 7, "member" should be --members--.

In Column 10, line 46, after the word "pivotal" insert the word --axis--.

In Column 14, line 32, "oneway" should be --one-way--.

Signed and Sealed this second Day of December 1975

[SEAL]

Attest:

RUTH C. MASON
*Attesting Officer*

C. MARSHALL DANN
*Commissioner of Patents and Trademarks*